(12) United States Patent
Eggler (10) Patent No.: US 12,263,992 B1
(45) Date of Patent: Apr. 1, 2025

(54) APPARATUS FOR SECURELY TRANSPORTING ITEMS IN A VEHICLE (71) Applicant: Paxton R. Eggler, Chelsea, AL (US)

(72) Inventor: Paxton R. Eggler, Chelsea, AL (US)

(*) Notice: Subject to any disclaimer, the term of this patent is extended or adjusted under 35 U.S.C. 154(b) by 309 days.

(21) Appl. No.: 18/113,840

(22) Filed: Feb. 24, 2023

Related U.S. Application Data (60) Provisional application No. 63/343,314, filed on May 18, 2022.

(51) Int. Cl.
F17C 13/08 (2006.01)
B60R 11/00 (2006.01)
B65D 25/10 (2006.01)

(52) U.S. Cl.
CPC .... B65D 25/102 (2013.01); *B60R 2011/0012* (2013.01); *B60R 2011/0017* (2013.01); *F17C 13/084* (2013.01)

(58) Field of Classification Search
CPC ............... F17C 13/084; B60R 7/043; B60R 2011/0012; B60R 2011/0015; B60R 2011/0017
USPC .......................................... 220/23.4; 224/275
See application file for complete search history.

(56) References Cited

U.S. PATENT DOCUMENTS

| | | | |
|---|---|---|---|
| 3,828,994 A * | 8/1974 | Hollins | B60N 2/809 224/544 |
| 3,851,936 A * | 12/1974 | Muller | F16B 12/20 206/499 |
| 3,902,640 A * | 9/1975 | Geiben | A45F 3/04 224/245 |
| 4,328,902 A * | 5/1982 | North | B65D 21/0204 220/516 |
| 4,905,855 A | 3/1990 | Troiano et al. | |
| 4,932,621 A * | 6/1990 | Kowk | F16M 11/22 248/346.5 |
| 5,035,389 A * | 7/1991 | Wang | F16M 11/041 248/225.11 |
| D367,960 S | 3/1996 | Werbesky, Jr. | |
| 5,542,589 A * | 8/1996 | McKee | B60R 7/043 455/344 |
| 5,752,719 A * | 5/1998 | Mitschelen | B60N 2/90 280/801.1 |
| 6,042,130 A | 3/2000 | Souza | |
| 6,135,546 A * | 10/2000 | Demtchouk | B60N 3/002 297/135 |
| 6,386,559 B1 | 5/2002 | Souza | |

(Continued)

*Primary Examiner* — Justin M Larson
(74) *Attorney, Agent, or Firm* — AdamsIP, LLC; Kenneth M. Bush (57) ABSTRACT The apparatus for securely transporting an item in a vehicle, as disclosed herein, comprises a substantially cube-shaped housing, the housing adapted to receive the item therein, in various aspects. An elongated flexible strap is secured to a housing first side and at least one lower clip is tethered to the housing bottom, in various aspects. The lower clip is adapted to releasably attach to the vehicle, such as to a lower anchor of a vehicle LATCH system, to secure the housing bottom to the vehicle. The strap is adapted to pass through an opening through a housing second side and then be attached to a vehicle headrest to secure the item within the housing and the housing to the vehicle, in various aspects. The housing having the item therein is substantially immobilized when the lower clip and the strap are attached to the vehicle. Related methods are disclosed.

20 Claims, 7 Drawing Sheets

(56) References Cited

U.S. PATENT DOCUMENTS

| | | | |
|---|---|---|---|
| 6,588,365 B2 * | 7/2003 | Best Wright | A01K 1/0272 119/28.5 |
| 6,719,161 B1 * | 4/2004 | Craig | B65D 25/56 222/143 |
| 7,172,164 B2 * | 2/2007 | Fuelling | A01K 97/10 248/314 |
| 7,201,383 B2 * | 4/2007 | Gibby | B62B 1/264 220/826 |
| 7,316,435 B2 | 1/2008 | Leighton | |
| D564,619 S * | 3/2008 | Cogswell, Jr. | D23/206 |
| 7,383,789 B2 * | 6/2008 | Wilkes | A01K 1/0272 119/28.5 |
| 7,644,819 B2 | 1/2010 | Gill et al. | |
| 7,780,026 B1 * | 8/2010 | Zuckerman | B65D 21/0223 206/508 |
| 8,020,821 B2 * | 9/2011 | Chen | F16M 13/02 248/221.11 |
| 8,182,180 B2 | 5/2012 | Woodford et al. | |
| 8,261,782 B2 * | 9/2012 | Fredette | F16N 31/004 220/4.27 |
| 8,448,829 B2 * | 5/2013 | Watanabe | H05K 5/0073 224/547 |
| 9,290,300 B2 * | 3/2016 | Hendrickson | E04H 7/22 |
| 9,321,404 B1 | 4/2016 | Mellenthin | |
| 9,499,105 B1 | 11/2016 | Long | |
| D781,999 S * | 3/2017 | Salvati | D23/206 |
| 9,637,305 B2 * | 5/2017 | Fredette | B65D 9/06 |
| 9,744,909 B2 * | 8/2017 | Proulx | E05C 17/12 |
| 9,849,838 B1 | 12/2017 | Siciliano | |
| 10,648,722 B2 * | 5/2020 | Smith | F25D 3/08 |
| 10,710,623 B1 * | 7/2020 | Stys | B62B 5/067 |
| 10,967,803 B1 * | 4/2021 | Siciliano | B65D 21/0212 |
| 11,130,438 B2 | 9/2021 | Miller | |
| D1,025,284 S * | 4/2024 | Asari | D23/202 |
| 12,075,752 B2 * | 9/2024 | Templeton | B60R 22/16 |
| 12,208,940 B1 * | 1/2025 | Kendall | B65D 21/0204 |
| 2007/0131568 A1 * | 6/2007 | Georgia | B60R 7/043 206/234 |
| 2016/0325669 A1 | 11/2016 | Byham | |
| 2019/0380299 A1 * | 12/2019 | Shewfelt | B60R 22/10 |

\* cited by examiner

APPARATUS FOR SECURELY TRANSPORTING ITEMS IN A VEHICLE

CROSS-REFERENCE TO RELATED APPLICATIONS

The present application claims priority to and benefit of U.S. Provisional Patent Application No. 63/343,314, filed on May 18, 2022, the disclosure of which is hereby incorporated by reference herein in its entirety.

FIELD OF THE INVENTION

This disclosure relates to an apparatus for securely transporting items in a vehicle, and related methods of use.

BACKGROUND OF THE INVENTION

Transporting portable items in vehicles can be problematic and various devices have been developed to secure items as they are being transported to prevent the items from moving about or spilling over during vehicular movement. One particular problem is transporting common propane tank cylinders. These cylinders are very heavy and are awkward to carry to and from a vehicle. In addition, they are prone to tip over and roll about while being transported, which can lead to damage to the vehicle. In case of a traffic accident, an unsecured cylinder can become a dangerous heavy projectile.

Propane tank cylinders are difficult to secure in place due to their significant weight and raised center of gravity. Accordingly, there is a need for an improved apparatus for securely transporting an item, such as a propane tank cylinder, in a vehicle to prevent the item from tipping over or moving about, and related methods of use.

BRIEF SUMMARY OF THE INVENTION

These and other needs may be overcome by the apparatus and methods disclosed herein. Additional improvements and advantages may be recognized by those of ordinary skill in the art upon study of the present disclosure.

An apparatus for securely transporting an item in a vehicle, and related methods of use, as disclosed herein, comprises a substantially cube-shaped housing having an open top, the housing adapted to receive the item therein, in various aspects. An elongated strap member is secured to a housing first side, in various aspects. At least one lower clip may be tethered to the housing, preferably adjacent the housing bottom, in various aspects. The lower clip(s) may be adapted to releasably attach to the vehicle, such as to the lower anchor(s) of a vehicle LATCH system, to secure the housing bottom to the vehicle, in various aspects. The strap member may be adapted to pass through an opening through a housing second side and then be attached to the vehicle, such as the vehicle headrest, to secure the housing to the vehicle, in various aspects. The housing having the transport item therein is substantially immobilized when the lower clip(s) and the strap member are attached to the vehicle.

This summary is presented to provide a basic understanding of some aspects of the apparatus and methods disclosed herein as a prelude to the detailed description that follows below. Accordingly, this summary is not intended to identify key elements of the apparatus or methods disclosed herein or to delineate the scope thereof.

The Figures are exemplary only, and the implementations illustrated therein are selected to facilitate explanation. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances, or other such tolerances, as would be readily recognized by those of ordinary skill in the art upon study of this disclosure.

DETAILED DESCRIPTION OF THE INVENTION

The present disclosure is directed to an apparatus for securely transporting items in a vehicle, and related methods of use, without utilizing the vehicular seatbelts. Exemplary implementations of the transporting apparatus 20 are shown in FIGS. 1-8.

In an exemplary implementation, the apparatus 20 is adapted to securely transport a propane tank cylinder 10 in a vehicle, the tank cylinder 10 having an arcuate collar 11 with an opening 12 therethrough formed along the cylinder top end and a circular pedestal 13 formed along the cylinder bottom end, in various aspects. The vehicle preferably comprises a Lower Anchors and Tethers for Children (LATCH) system, which typically includes lower anchors 18 affixed at the back of each rear vehicle seat 15 below the seatback 16, and upper anchors 19 affixed at the top rear of the seatback 16. However, the apparatus 20 may be secured to the vehicle utilizing other mechanisms. The apparatus 20 is adapted to fit on the vehicle seat 15 and receive and secure the tank cylinder 10 therein. However, the apparatus 20 may be placed on other vehicle surfaces, such as the rear cargo area, trunk floor, truck bed, etc.

The apparatus 20 comprises a housing 21 having an interior 22, an exterior 23, an open top 24, a closed bottom 25, and a plurality of sides 26, in various aspects. The housing 21 may be made from a durable plastic material, such as high-density polyethylene (HDPE). The housing 21 may have a pair of opposing handles 27 to facilitate lifting and carrying the apparatus 20, in various aspects. The housing 21 includes at least one principal opening 28 in an upper end of one of the sides 26 to receive a strap member 31 therethrough, described in more detail below, in various aspects. The housing 21 may include a recessed bottom portion 29, preferably circular in shape, to receive the cylinder pedestal 13 therein to promote stabilization of the tank cylinder 10 during transport, in various aspects. The housing 21 may include various auxiliary openings 30 thereabout to allow passage of other items through the housing 21, in various aspects. For example, the apparatus 20 may be used to transport food items to family gatherings, potlucks, and the like, in which case a power cord (not shown) can be connected between a cook pot (not shown) secured within the housing 21 and a vehicular power source (not shown) through an auxiliary opening 30 to keep the food item heated during transport, in various aspects.

An elongated adjustable strap member 31 is secured to one of the sides 26 of the housing 21, preferably directly opposite the principal opening 28, in various aspects. The strap member 31 is preferably made of a strong flexible fabric material, such as a nylon webbing. At least one lower clip 32 is preferably adjustably attached to the housing 21 adjacent the housing bottom 25, in various aspects. The lower clip 32 is adapted to releasably attach to a lower anchor 18 of the vehicle LATCH system to secure the housing bottom 25 to the vehicle seat 15, in various aspects. One or more auxiliary clips 33 may be adjustably attached to the housing 21, the auxiliary clips 33 adapted to releasably attach to various anchor points in the vehicle, such as an upper anchor 19 of the vehicle LATCH system, to further secure the housing 21 to the vehicle. The lower and auxiliary clips 32, 33 may be spring clips or carabiners. An interior adjustable strap 34 may be included to secure an item within the housing 21, such as a cook pot (e.g., crock pot) or the like.

Figure 1:
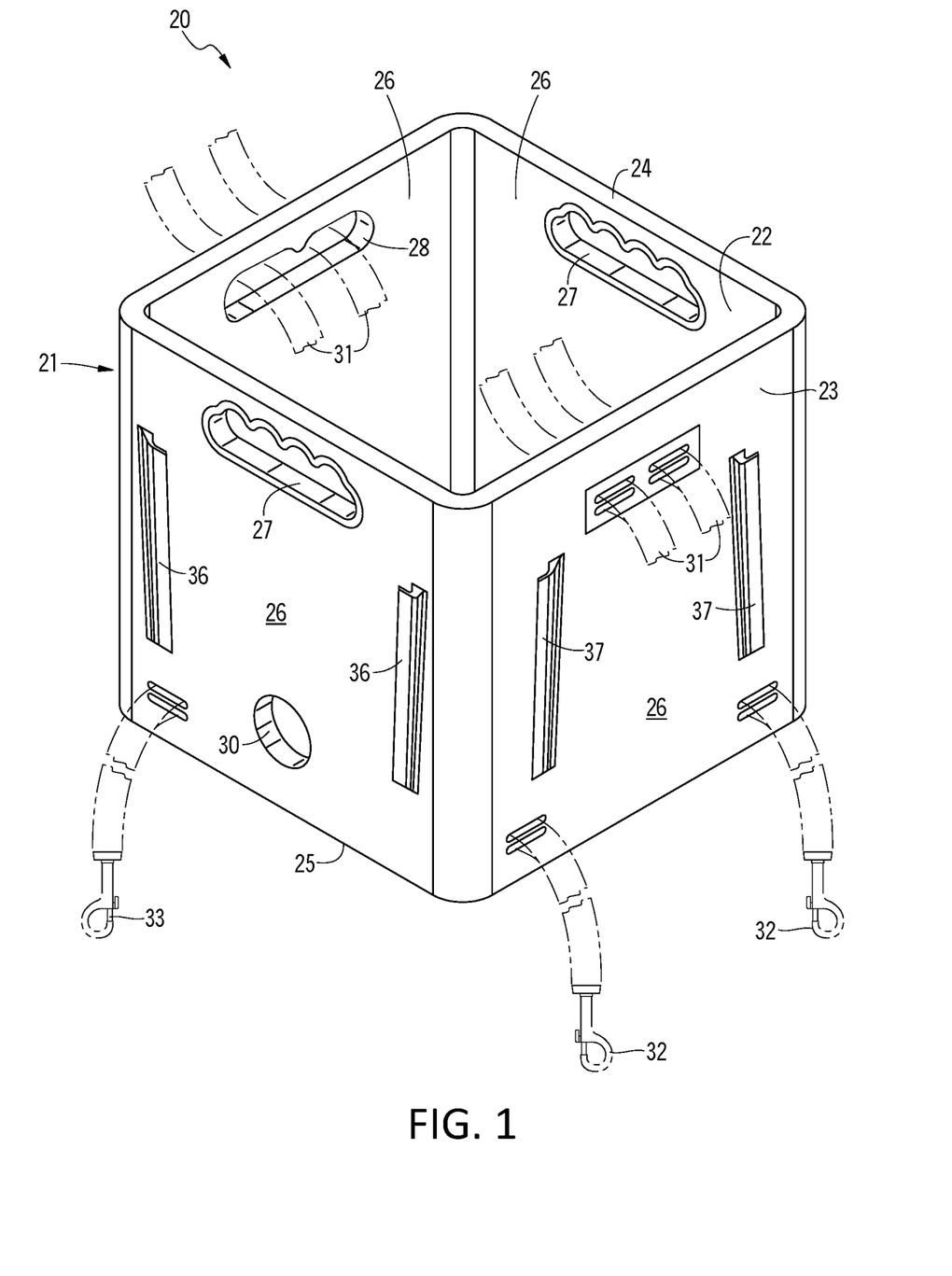
FIG. 1 illustrates by top perspective view an exemplary implementation of a transporting apparatus.
Figure 2:
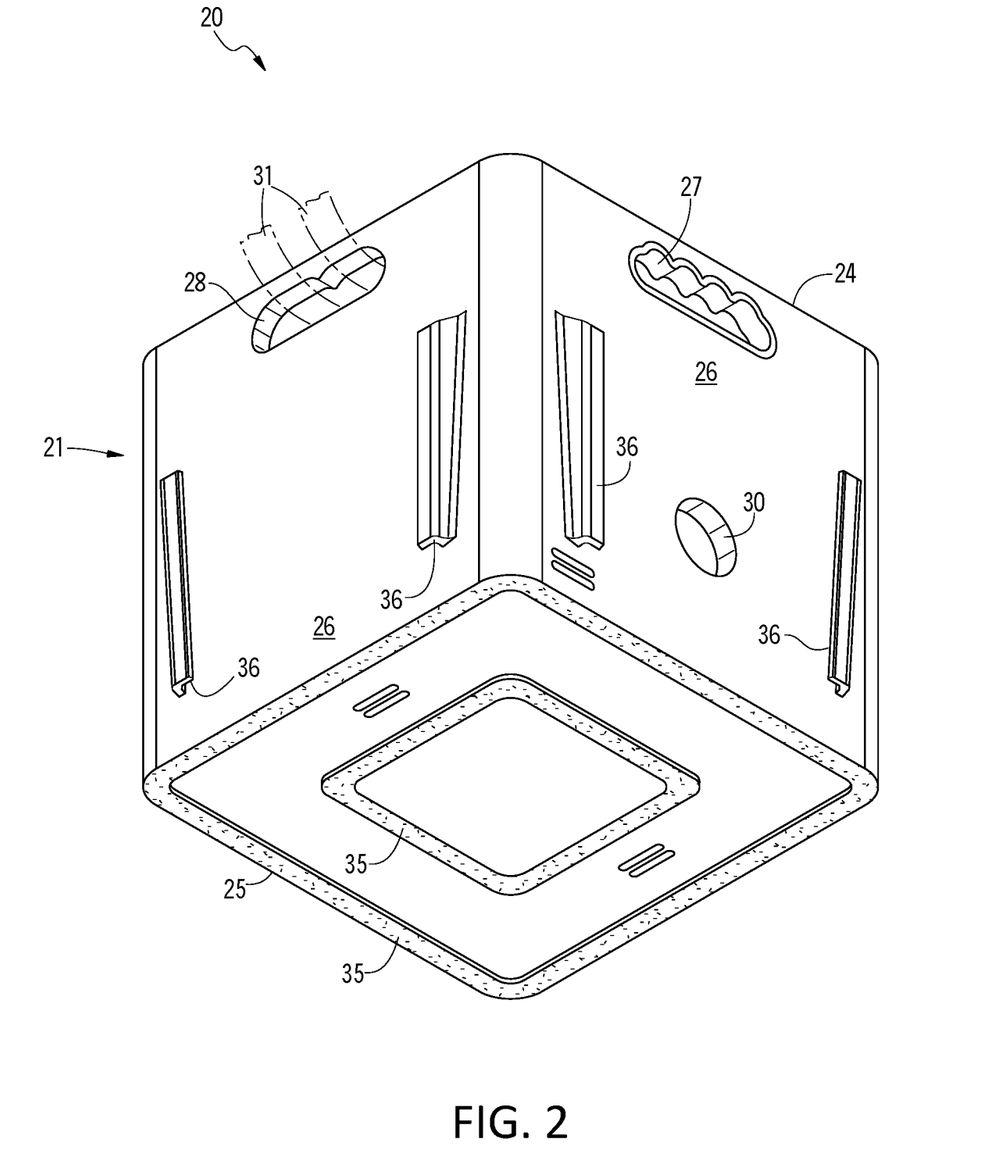
FIG. 2 illustrates by bottom perspective view the transporting apparatus of FIG. 1.
Figure 3:
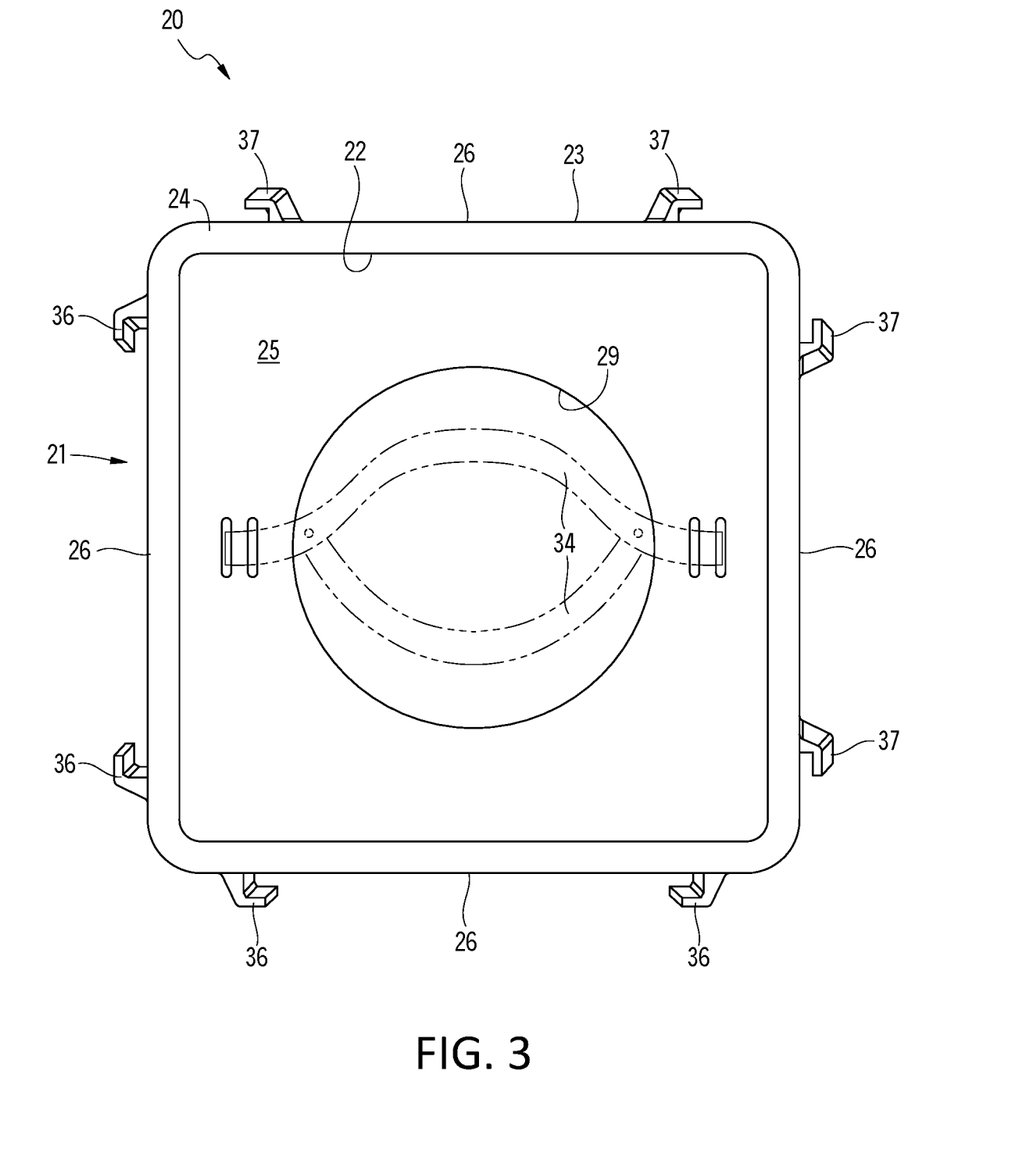
FIG. 3 illustrates by top plan view the transporting apparatus of FIG. 1.
Figure 4:
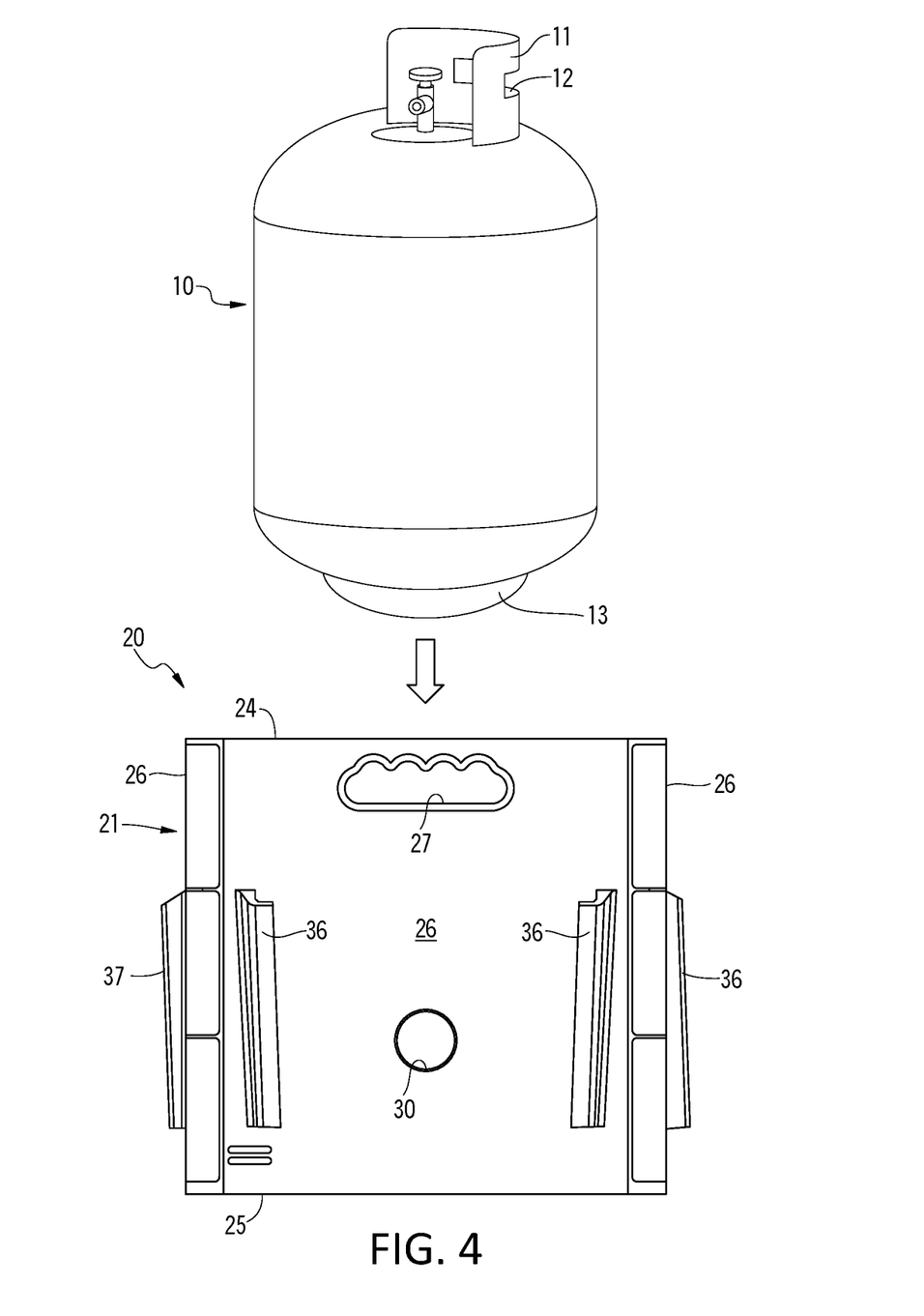
FIG. 4 illustrates by side elevation view an exemplary implementation of a transporting apparatus adapted to receive an exemplary propane tank cylinder therein.

An anti-slip material 35, such as rubber, may be secured to the housing bottom 25 as shown in FIG. 2, in various aspects. The anti-slip material 35 is adapted to prevent the housing 21 from sliding when the housing 21 is seated on the vehicle seat 15 or other vehicular surface.

Figure 6:
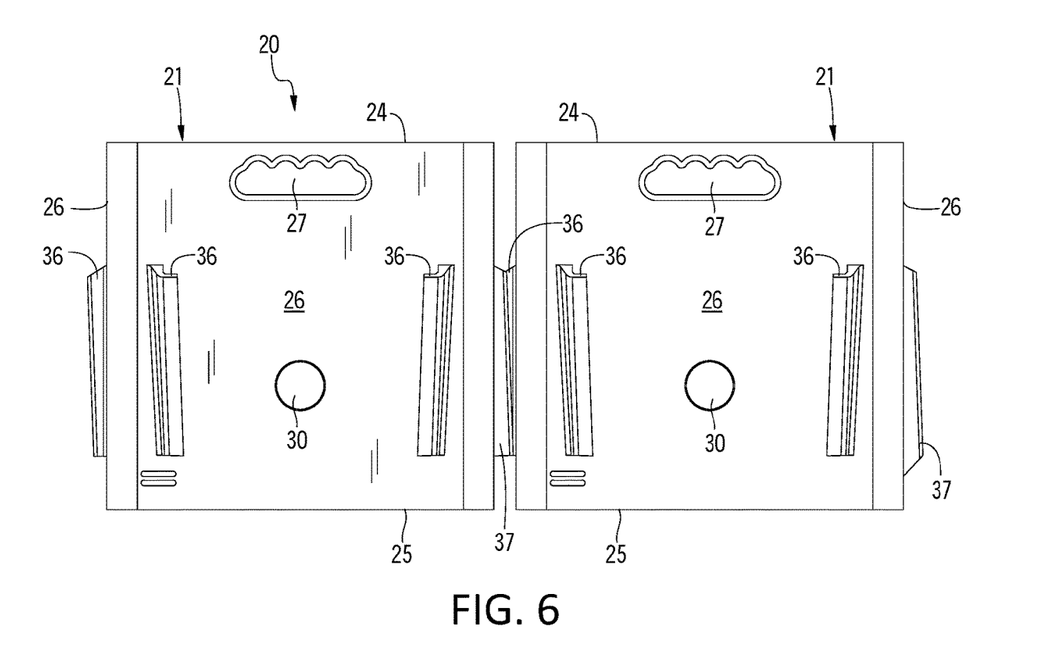
FIG. 6 illustrates by schematic view an exemplary implementation of a first transporting apparatus coupled to an exemplary implementation of a second transporting apparatus.
Figure 7:
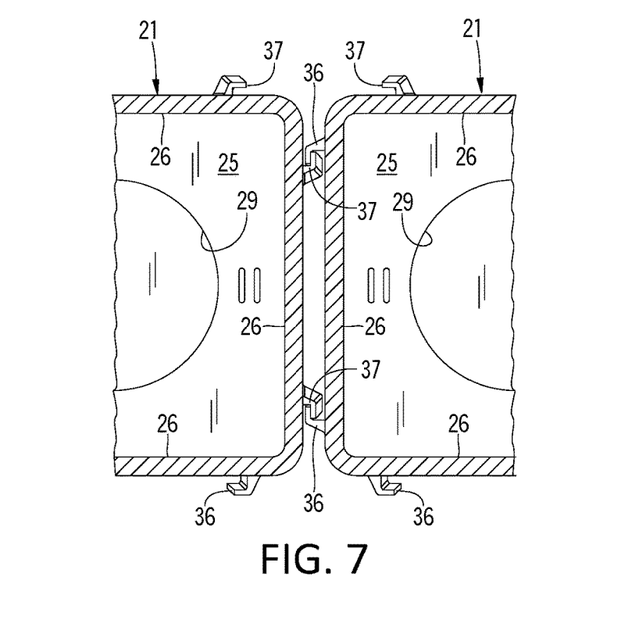
FIG. 7 illustrates by top sectional view portions of the first transporting apparatus secured to the second transporting apparatus of FIG. 6.

The apparatus housing 21 can be designed to interlock with a housing 21 from another transporting apparatus 20, as shown in FIGS. 6-7. In this implementation, each housing 21 has a pair of cooperating inwardly facing tapered slide fastening members 36 formed along an exterior surface of at least one of the sides 26 and a pair of cooperating outwardly facing tapered slide fastening members 37 formed along an exterior surface of at least one of the other sides 26. Thus, for example, the cooperating inwardly facing tapered slide fastening members 36 of a first transporting apparatus may slidably receive the cooperating outwardly facing tapered slide fastening members 37 from a second transporting apparatus such that the apparatuses are removably coupled together.

Figure 8:
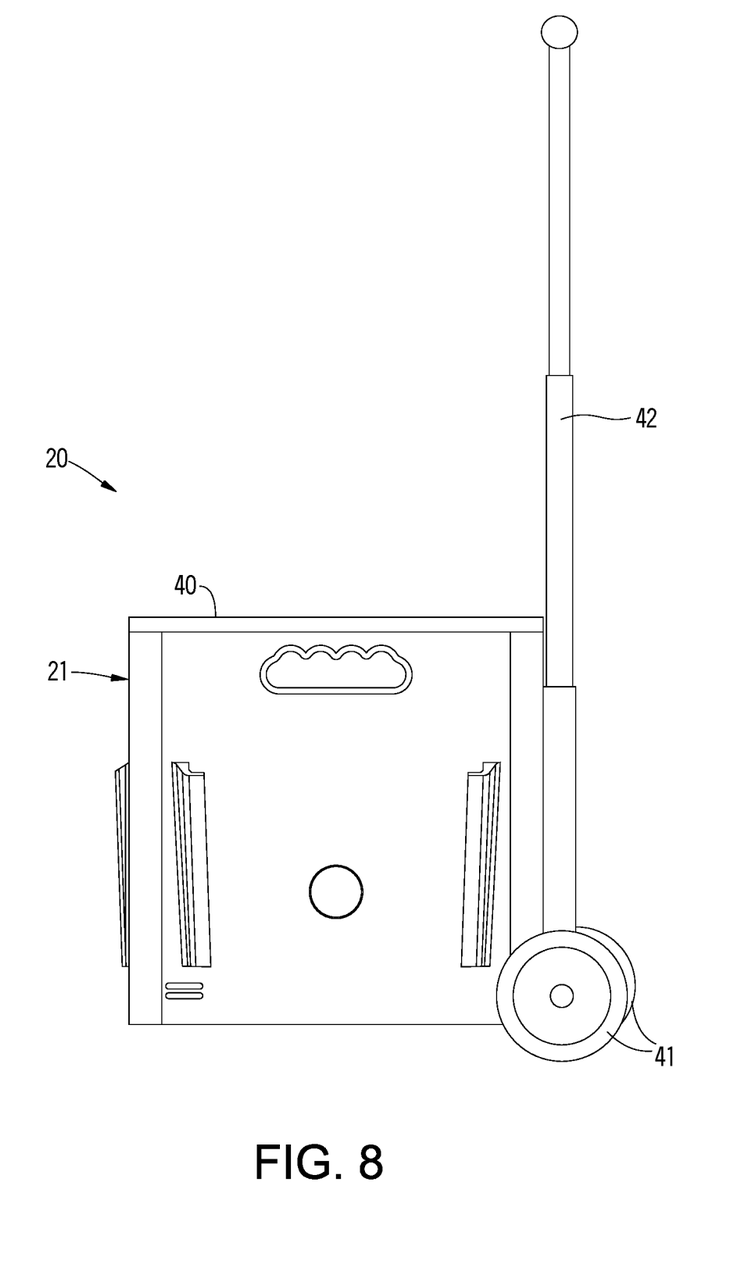
FIG. 8 illustrates by side elevation view another exemplary implementation of a transporting apparatus.

As shown in FIG. 8. the transporting apparatus 20 may include a lid 40 for the housing 21. The lid 40 may be completely detachable or hingedly attached to the housing 21, such as along the upper exterior edge of one of the sides 26. The lid 40 may be reversibly securable onto the housing 21, for example, with one or more lockable latches (not shown) or the like. The transporting apparatus 20 may include a pair of cooperating wheels 41 mounted adjacent the housing bottom 25 and a telescoping handle 42 mounted to one of the housing sides 26 to assist in transporting the apparatus 20 to and from the vehicle. The wheels 41 and handle 42 may be removable.

Figure 5:
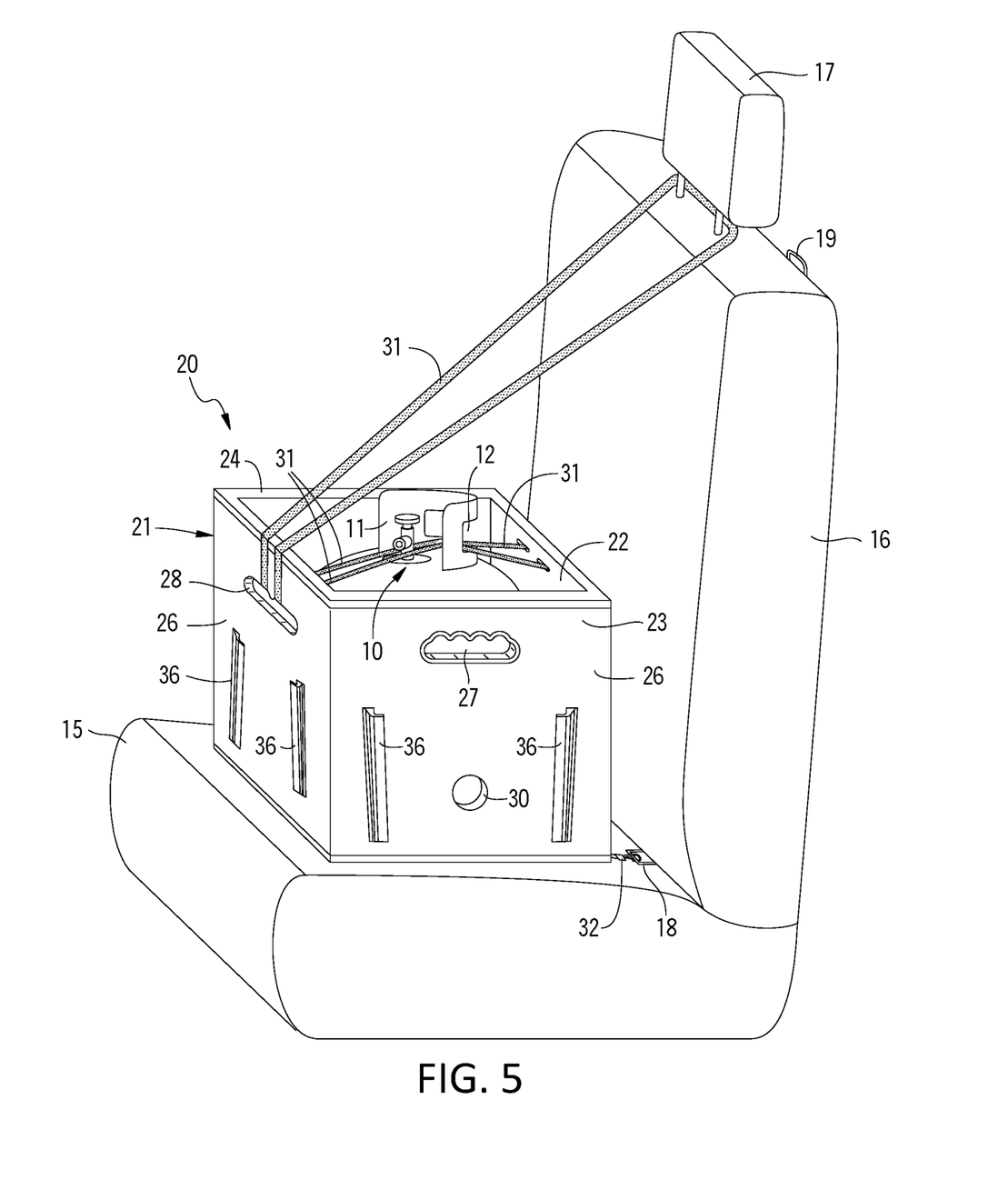
FIG. 5 illustrates by schematic view an exemplary implementation of a transporting apparatus secured to a vehicle seat and securing an exemplary propane tank cylinder therein.

In an exemplary use, a transport item, such as a tank cylinder 10, may be seated within the housing 21 and the housing 21 may be placed in the car seat 15, in this implementation. The lower clips 32 may be secured to the lower anchors 18 of the LATCH system. The strap member 31 may be threaded through the collar opening 12, then through the principal opening 28, and then pulled back toward the seatback 16 and secured about the headrest 17, thereby securing the cylinder 10 within the housing 21 and the housing 21 to the vehicle seat 15 and seatback 17. The strap member 31 is preferably adjustable so that tension in the strap member 31 can be adjusted as desired. The housing 21 having the cylinder 10 therein is substantially immobilized when the lower clip(s) 32 are attached to the LATCH lower anchor(s) 18 and the strap member 31 is secured as described above, thereby preventing the cylinder 10 from shifting and damaging the vehicle or injuring an occupant, for example, during a hard brake or vehicular accident, including where the vehicle flips or rolls over.

The optional auxiliary clip(s) 33 may be attached to the LATCH upper anchor(s) 19 to provide additional securement. In another implementation, the strap member 31 can include a clip that attaches directly to the LATCH upper anchor 19 rather than to the headrest 17.

In another exemplary use, a transport item, such as a cook pot (not shown), may be seated within the housing 21 and secured to the housing 21 with the interior adjustable strap 34, in this implementation. The housing 21 may be placed in the car seat 15 and the lower clips 32 may be secured to the lower anchors 18 of the LATCH system. The strap member 31 may be threaded through the principal opening 28 and then pulled back toward the seatback 16 and secured about the headrest 17, thereby securing the housing 21 to the vehicle seat 15 and seatback 17. The housing 21 having the transport item therein is substantially immobilized when the lower clip(s) 32 are attached to the LATCH lower anchor(s) 18 and the strap member 31 is secured as described above, thereby preventing the transport item from shifting, for example, during a hard brake or vehicular accident.

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72 (b) only. Accordingly, the Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as described herein and as defined in the following claims.

The invention claimed is:

1. An apparatus for securely transporting a transport item in a vehicle, the apparatus comprising:
   a housing having an interior, an exterior, an open top, a closed bottom, and a plurality of sides, the housing adapted to receive the transport item therein;
   an elongated strap member secured to a housing first side, the strap member made of a flexible fabric material; and
   a lower clip tethered to the housing adjacent the housing bottom, the lower clip adapted to releasably attach to the vehicle to secure the housing bottom to the vehicle;

wherein the strap member is adapted to pass through an opening in a housing second side and then be secured about a headrest of the vehicle to secure the housing to the vehicle;

wherein the housing having the transport item therein is substantially immobilized when the lower clip and the strap member are attached to the vehicle.

2. An apparatus according to claim 1, wherein an exterior surface of one of the housing sides includes a pair of cooperating inwardly facing tapered slide fastening members adapted to slidably receive a pair of cooperating outwardly facing tapered slide fastening members from a separate device to thereby secure the housing to the device.

3. An apparatus according to claim 1, wherein an exterior surface of one of the housing sides includes a pair of cooperating outwardly facing tapered slide fastening members adapted to slidably receive a pair of cooperating inwardly facing tapered slide fastening members from a separate device to thereby secure the housing to the device.

4. An apparatus according to claim 1, further comprising an anti-slip member secured to an exterior surface of the housing bottom, the anti-slip member adapted to prevent the housing from sliding when the housing is seated in the vehicle.

5. An apparatus according to claim 1, wherein an interior surface of the housing bottom includes a circular recess adapted to receive a bottom surface of the transport item therein to prevent the transport item from sliding within the housing.

6. An apparatus according to claim 1, further comprising a pair of handles to promote lifting and carrying the housing.

7. An apparatus according to claim 1, further comprising:
a pair of cooperating wheels mounted adjacent the housing bottom; and
a telescoping handle mounted to one of the housing sides.

8. An apparatus according to claim 1, further comprising:
an interior securing strap mounted within the housing interior to secure the transport item to the housing; and
at least one auxiliary hole through one of the sides for receiving a power cord therethrough.

9. An apparatus for securely transporting a propane tank cylinder in a vehicle having a LATCH system, the cylinder having a collar with an opening therethrough, the apparatus comprising:
a housing having an interior, an exterior, an open top, a closed bottom, and a plurality of sides, the housing adapted to fit on a seat of the vehicle, the housing adapted to receive the cylinder therein;
an elongated strap member secured to a housing first side, the strap member made of a flexible fabric material;
a lower clip tethered to the housing adjacent the housing bottom, the lower clip adapted to releasably attach to a lower anchor of the vehicle LATCH system to secure the housing bottom to the vehicle seat; and
an anti-slip member secured to the housing bottom, the anti-slip member adapted to prevent the housing from sliding when the housing is seated on the vehicle seat;
wherein the strap member is adapted to pass through the cylinder collar opening and then through an opening through a housing second side and then be secure about a headrest of the vehicle seat and thereby secure the cylinder within the housing and the housing to the vehicle seat;
wherein the housing having the cylinder therein is substantially immobilized when the lower clip is attached to the lower anchor and the strap member is attached to the headrest.

10. An apparatus according to claim 9, further comprising an auxiliary clip tethered to the housing, the auxiliary clip adapted to releasably attach to an upper anchor of the vehicle LATCH system to secure the housing to the vehicle seat.

11. An apparatus according to claim 9, wherein an exterior surface of a first one of the housing sides includes a pair of cooperating inwardly facing tapered slide fastening members adapted to slidably receive a pair of cooperating outwardly facing tapered slide fastening members from a first device to thereby secure the housing to the first device, wherein an exterior surface of a second one of the housing sides includes a pair of cooperating outwardly facing tapered slide fastening members adapted to slidably receive a pair of cooperating inwardly facing tapered slide fastening members from a second device to thereby secure the housing to the second device.

12. An apparatus according to claim 9, wherein an interior surface of the housing bottom includes a circular recess adapted to receive a bottom surface of the cylinder therein to prevent the cylinder from sliding within the housing.

13. An apparatus according to claim 9, further comprising a pair of handles to promote lifting and carrying the housing.

14. An apparatus according to claim 9, further comprising:
a pair of cooperating wheels mounted adjacent the housing bottom; and
a telescoping handle mounted to one of the housing sides.

15. A method of securing a propane tank cylinder in a vehicle for transport, the vehicle having a LATCH system and the cylinder having a collar with an opening therethrough, the method comprising the steps of:
a) providing an apparatus comprising:
i. a housing having an interior, an exterior, an open top, and a closed bottom, the housing adapted to fit on a seat of the vehicle, the housing adapted to receive the cylinder therein;
ii. an elongated strap member secured to a housing first side, the strap member made of a flexible fabric material; and
iii. a lower clip tethered to the housing adjacent the housing bottom, the lower clip adapted to releasably attach to a lower anchor of the vehicle LATCH system to secure the housing bottom to the vehicle seat;
b) securing the lower clip to the lower anchor of the vehicle LATCH system;
c) passing the strap member through the cylinder collar opening and then through an opening in a housing second side; and
d) attaching the strap member to a headrest of the vehicle seat and thereby securing the cylinder within the housing and the housing to the vehicle seat;
e) wherein the housing having the cylinder therein is substantially immobilized when the lower clip is attached to the lower anchor and the strap member is attached to the headrest.

16. A method according to claim 15, wherein the apparatus further comprises an auxiliary clip tethered to the housing, the auxiliary clip adapted to releasably attach to an upper anchor of the vehicle LATCH system to secure the housing to the vehicle seat.

17. A method according to claim 15, wherein an exterior surface of a first one of the housing sides includes a pair of cooperating inwardly facing tapered slide fastening members adapted to slidably receive a pair of cooperating outwardly facing tapered slide fastening members from a first device to thereby secure the housing to the first device, wherein an exterior surface of a second one of the housing sides includes a pair of cooperating outwardly facing tapered slide fastening members adapted to slidably receive a pair of cooperating inwardly facing tapered slide fastening members from a second device to thereby secure the housing to the second device.

18. A method according to claim 15, wherein an interior surface of the housing bottom includes a circular recess adapted to receive a bottom surface of the cylinder therein to prevent the cylinder from sliding within the housing.

19. A method according to claim 15, wherein the apparatus further comprises a pair of handles to promote lifting and carrying the housing.

20. A method according to claim 15, wherein the apparatus further comprises:
- a pair of cooperating wheels mounted adjacent the housing bottom; and
- a telescoping handle mounted to one of the housing sides.

\* \* \* \* \*